United States Patent
Sullivan et al.

(10) Patent No.: US 7,238,030 B2
(45) Date of Patent: Jul. 3, 2007

(54) MULTI-FUNCTION EXPANSION SLOTS FOR A STORAGE SYSTEM

(75) Inventors: Douglas Sullivan, Hopkinton, MA (US); Robert P. Valentine, Auburn, MA (US); Steven D. Sardella, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/017,308

(22) Filed: Dec. 20, 2004

(65) Prior Publication Data

US 2006/0134936 A1    Jun. 22, 2006

(51) Int. Cl.
 *H01R 12/00*    (2006.01)
(52) U.S. Cl. ............................... 439/61; 361/785
(58) Field of Classification Search .................. 439/61, 439/65; 361/784, 785
See application file for complete search history.

(56) References Cited

U.S. PATENT DOCUMENTS

| | | | |
|---|---|---|---|
| 5,754,796 A | 5/1998 | Wang et al. ................ 710/301 |
| 6,389,494 B1 | 5/2002 | Walton et al. .............. 710/317 |
| 6,906,929 B2 * | 6/2005 | Chiu ........................... 361/788 |
| 6,924,986 B1 | 8/2005 | Sardella et al. ............. 361/785 |
| 6,934,152 B1 | 8/2005 | Barrow ........................ 361/690 |
| 6,948,031 B2 | 9/2005 | Chilton ....................... 711/113 |
| 6,957,285 B2 | 10/2005 | Walton et al. ................ 710/36 |
| 6,973,593 B1 | 12/2005 | Zani et al. ..................... 714/31 |
| 6,988,152 B2 | 1/2006 | Walton et al. ................ 710/56 |
| 2002/0156984 A1 | 10/2002 | Padovano .................... 711/148 |
| 2003/0123219 A1 | 7/2003 | Chiu ........................... 361/683 |

OTHER PUBLICATIONS

Pilvi Koski, International Search Report for Application No. PCT/US2005/046472, May 26, 2006.

* cited by examiner

Primary Examiner—Khiem Nguyen
(74) Attorney, Agent, or Firm—BainwoodHuang

(57) ABSTRACT

A system having expansion slots is capable of multiple configurations. In a first configuration, a first blade is coupled to a first module via a first expansion slot and a second blade is coupled to a second module via a second expansion slot. The first and second modules may be I/O modules such as PCI Express modules. In a second configuration the first and second blades are both coupled to a third module via the first and second expansion slots. The third module may be a shared resource such as a cache card.

14 Claims, 3 Drawing Sheets

MULTI-FUNCTION EXPANSION SLOTS FOR A STORAGE SYSTEM

FIELD OF THE INVENTION

The present invention relates generally to field of expandable electronic systems, and particularly to the use of expansion slots to provide flexible system configurations.

BACKGROUND OF THE INVENTION

Today's networked computing environments are used in businesses for generating and storing large amounts of critical data. The systems used for moving, storing, and manipulating this critical data are expected to have high performance, high capacity, and high reliability, while being reasonably priced. In addition, certain systems within the networked computing environment may be required to provide different specific functionality depending upon how the environment is configured. For example, some storage systems may require extra I/O capacity, wherein others may require more memory. The system manufacturer must be capable of providing various required configurations for its customers.

In the past, system manufacturers have provided and maintained entirely separate systems for each configuration required. This is a disadvantageous solution, as more parts must be purchased, more inventory maintained, and more field replaceable units must be stocked and made available. This raises the costs of production, maintenance, and ultimately the cost to the end user. What is desired is to produce a storage system that is flexible enough to support various configurations in a cost effective manner.

SUMMARY OF THE INVENTION

In accordance with the principles of the invention, a flexibly configurable system is provided. In a first configuration, a first blade is coupled to a first module via a first expansion slot and a second blade is coupled to a second module via a second expansion slot. The first and second modules may be I/O modules such as PCI Express modules. In a second configuration the first and second blades are both coupled to a third module via the first and second expansion slots. The third module may be a shared resource such as a cache card. The flexibly configurable expansion slots are particularly useful in a storage environment where various different types of storage systems require different expansion resources.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

In accordance with the principles of the invention, a flexibly configurable system is provided. In a first configuration, a first blade is coupled to a first module via a first expansion slot and a second blade is coupled to a second module via a second expansion slot. In a second configuration the first and second blades are both coupled to a third module via the first and second expansion slots. For example, the first and second modules may be I/O modules, for use when the system requires I/O expansion. The third module may be a shared resource such as a memory module, for use when the system requires memory redundancy or back-up. The flexibly configurable expansion slots are useful for example in a storage environment where various different types of storage systems require different expansion resources. The invention is thus described as implemented in a storage environment, with the understanding that it is applicable in many other types of environments.

Figure 1:
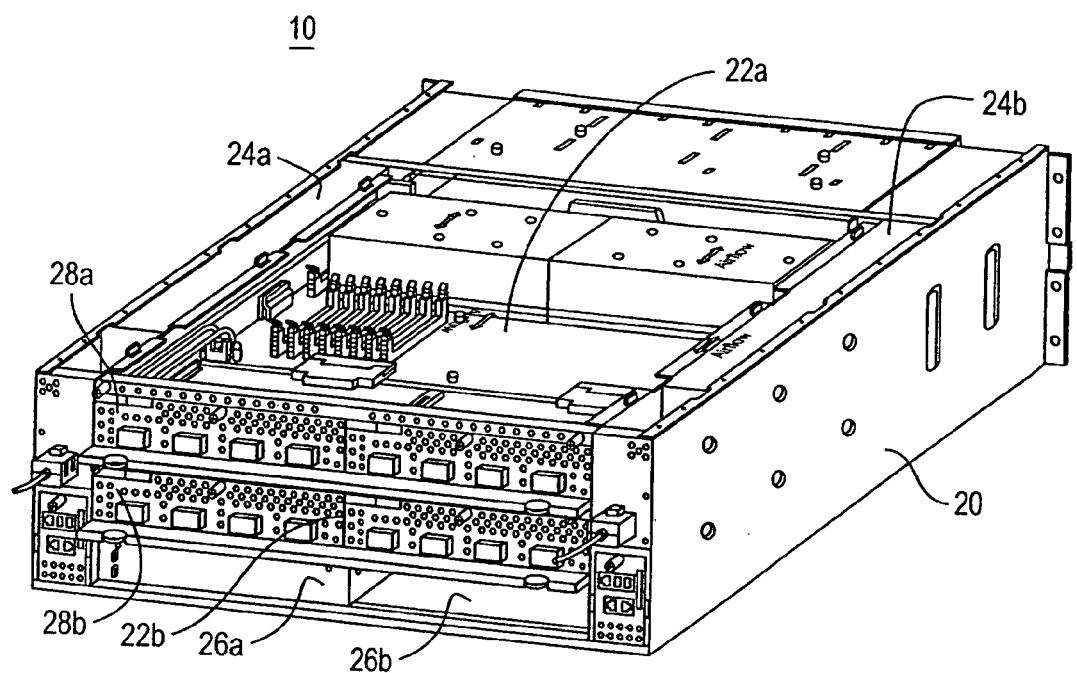
FIG. 1 is an isometric view of a storage system in which the invention may be implemented.

The Referring to FIG. 1, there is shown a portion of a storage system 10 that is one of many types of systems in which the principles of the invention may be employed. The storage system 10 shown may operate stand-alone or may populate a rack including other similar systems. The storage system 10 may be one of several types of storage systems. For example, if the storage system 10 is part of a storage area network (SAN), it is coupled to disk drives via a storage channel connection such as Fibre Channel. If the storage system 10 is, rather, a network attached storage system (NAS), it is configured to serve file I/O over a network connection such as an Ethernet.

Figure 2:
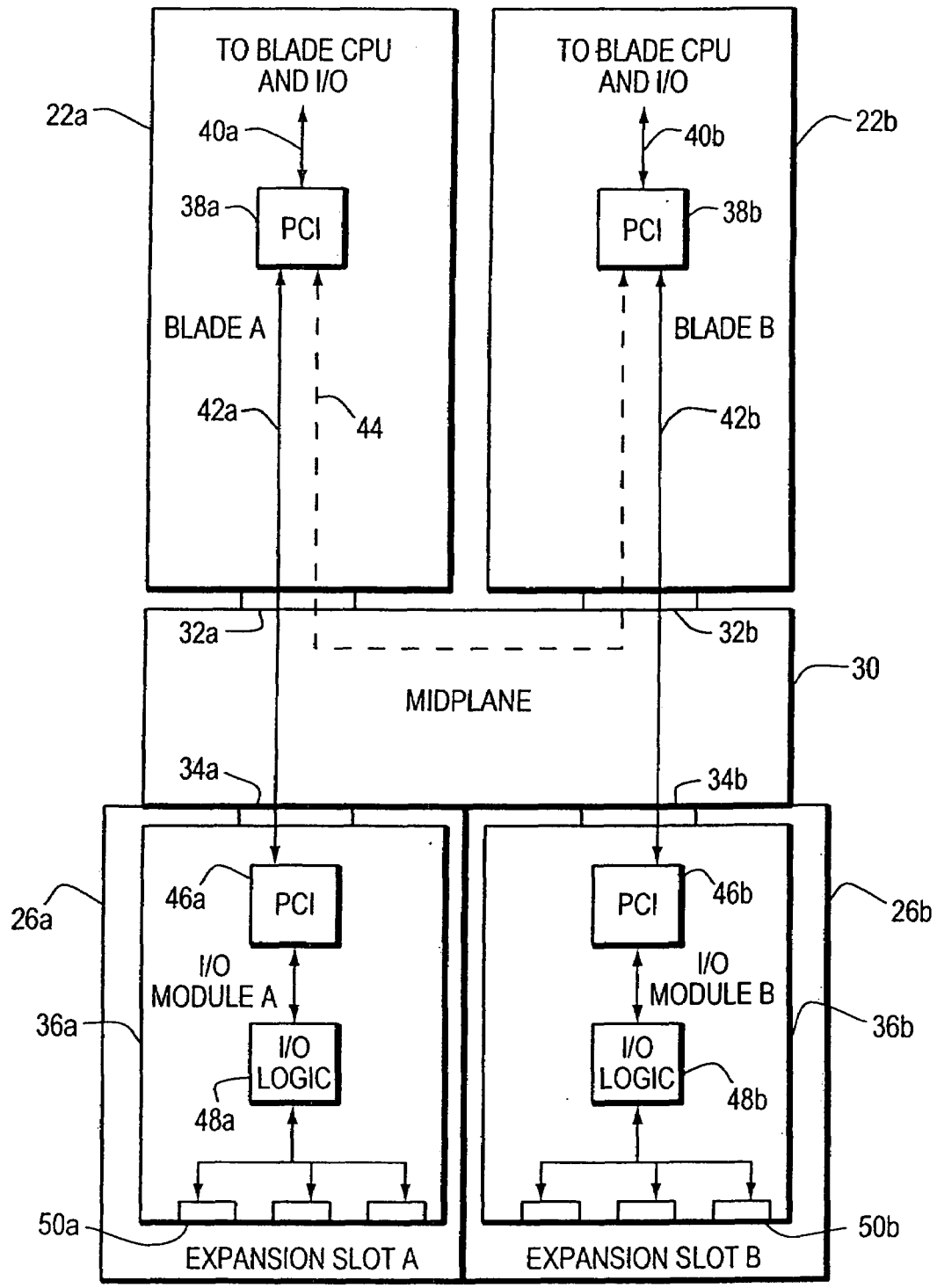
FIG. 2 is a schematic representation of a first configuration of the system of FIG. 1 showing a blades, two expansion slots, and two I/O modules installed in the expansion slots.

The storage system 10 includes within a chassis 20 a pair of blades 22a and 22b, dual power supplies 24a,b and dual expansion slots 26a,b. The blades 22a and 22b are positioned in slots 28a and 28b respectively. The blades 22a,b include CPUs, memory, controllers, I/O interfaces and other circuitry specific to the type of system implemented. The blades 22a and 22b are preferably redundant to provide fault tolerance and high availability. The dual expansion slots 26a,b are also shown positioned side by side and below the blades 22a and 22b respectively. The blades 22a,b and expansion slots 6a,b are coupled via a midplane 30 (FIG. 2). In accordance with the principles of the invention, the expansion slots 26a,b can be used in several ways depending on system requirements.

In FIG. 2, the interconnection between modules in the expansion slots 26a,b and the blades 22a,b is shown schematically in accordance with a first configuration. Each blade 22a,b is coupled to the midplane 30 via connectors 32a,b. The expansion slots 26a,b are also shown coupled to the midplane 30 via connectors 34a,b. The blades 22a,b can thus communicate with modules installed in the expansion slots 26a,b across the midplane 30. In this configuration, two I/O modules 36a and 36b are shown installed within the expansion slots 26a and 26b respectively and thus communicate with the blades 22a,b separately via the midplane 30.

In accordance with a preferred embodiment, the blades 22a,b and I/O modules 36a,b communicate via PCI Express buses—though it will be understood that PCI Express is only one example of many different types of busses that could be employed. (PCI Express is described in the PCI-SIG document "PCI Express Base Specification 1.0a" and accompanying documentation.) Each blade 22a,b includes a PCI Express switch 38a,b that drives a PCI Express bus 40a,b to and from blade CPU and I/O resources. The switches 38a,b split each PCI Express bus 40a,b into two PCI Express buses. One PCI Express bus 42a,b is coupled to the corresponding expansion slot 26a,b. The other PCI Express bus 44 is coupled to the other blade and is not used in this configuration—thus it is shown dotted. The I/O modules 36a,b are PCI Express cards, including PCI Express controllers 46a,b coupled to the respective bus 42a,b. Each I/O module 36a,b includes I/O logic 48a,b coupled to the PCI Express controller 46a,b for interfacing between the PCI Express bus 42a,b and various interfaces 50a,b such as one or more Fibre Channel ports, one or more Ethernet ports, etc. depending on design requirements. Furthermore, by employing a standard bus interface such as PCI Express, off-the-shelf PCI Express cards may be employed as needed to provide I/O functionality with fast time to market.

The configuration of FIG. 2 is particularly useful where the storage system 10 is used as a NAS. The NAS is I/O intensive; thus, the I/O cards provide the blades 22a,b with extra I/O capacity, for example in the form of gigabit Ethernet ports.

Figure 3:
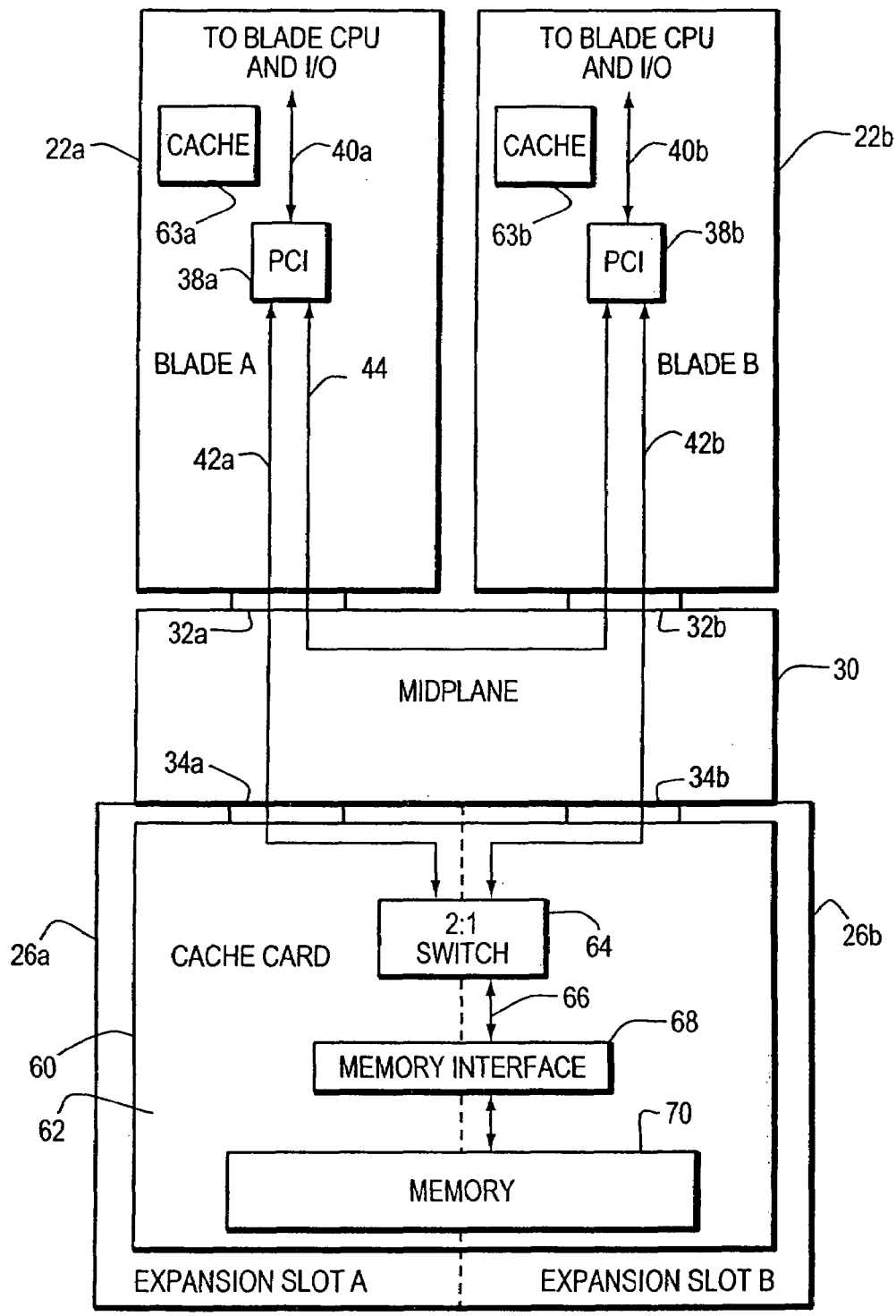
FIG. 3 is a schematic representation of a second configuration of the system of FIG. 1 showing the blades, two expansion slots, and one shared cache memory card installed in both the expansion slots.

Referring to FIG. 3, there is shown an alternate arrangement for use of the expansion slots 26a,b. In this arrangement, a single shared resource 60 is inserted in both the expansion slots 26a,b and is shared by the blades 22a,b. The shared resource 60 may be for example a cache card 62. The cache card 62 is particularly useful for purposes of high availability in a SAN arrangement. In a SAN arrangement using redundant blades 22a,b as shown, each blade includes cache memory 63a,b for caching writes to the disks. During normal operation, each blade's cache is mirrored in the other. The blades 22a,b mirror the data between the caches 63a,b by transferring it over the PCI Express bus 44. If one of the blades, for example blade 22a, fails, the mirrored cache 63a becomes unavailable to the other blade 22b. In this case, the surviving blade 22b can access the cache card 62 via the PCI Express bus 42b for caching writes, at least until the failed blade 22a recovers or is replaced.

As seen in FIG. 3, the cache card 62 includes a two-to-one PCI Express switch 64 coupled to the PCI Express buses 42a,b. The switch 64 gates either of the two buses to a single PCI Express bus 66 coupled to a memory interface 68. The memory interface 68 is coupled to the cache memory 70. Either blade 22a or 22b can thus communicate with the cache memory 70.

Referring to both FIGS. 2 and 3, it is noted that the PCI Express bus 44 is not used in the NAS arrangement but is used in the SAN arrangement. Were the PCI Express switches 38a,b not provided, The PCI Express bus 40a,b would be coupled directly to the PCI Express bus 44 for SAN functionality and thus would not be usable in the NAS arrangement. Through addition of the switches 38a,b, the PCI Express bus 40a,b is useful in the NAS arrangement when the PCI Express bus 44 is not in use, and is useful in the SAN arrangement during a blade failure. Note that the PCI Express bus 44 and the PCI Express buses 42a,b are not used at the same time, so full bus bandwidth is always maintained The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, the invention would be useful in a computer system where multiple processor modules require different expansion resources to meet different product requirements. Processor modules might require installation of certain types of I/O resources in expansion slots in some cases, and might require installation of a shared resource, such as a memory or disk storage, across multiple expansion slots in other cases. Furthermore, though PCI Express busses are described herein, any bus protocol or combination thereof could be employed without departing from the principles of the invention.

We claim:

1. Apparatus comprising:
a first blade coupled to a first expansion slot;
a second blade coupled to a second expansion slot;
wherein the apparatus is capable of a first configuration wherein the first blade is coupled to a first module via the first expansion slot and the second blade is coupled to a second module via the second expansion slot,
wherein the apparatus is capable of a second configuration wherein the first and second blades are both coupled to a third module via the first and second expansion slots.

2. The apparatus of claim 1 wherein the first and second modules are I/O modules.

3. The apparatus of claim 2 wherein the I/O modules are PCI Express modules.

4. The Apparatus of claim 1 wherein the third module comprises a shared resource which is accessible by either the first or second blade.

5. The apparatus of claim 4 wherein the shared resource is a cache memory.

6. The apparatus of claim 1, comprising a chassis defining the first expansion slot and the second expansion slot, the chassis having a first connector disposed within the first expansion slot and a second connector disposed within the second expansion slot, the first blade being in electrical communication with the first connector disposed within the first expansion slot and the second blade being in electrical communication with the second connector disposed within the second expansion slot.

7. The apparatus of claim 6, comprising a midplane disposed within the chassis, the first connector coupled to a first connection side of the midplane, the second connector coupled to the first connection side of the midplane, the first blade coupled to a second connection side of the midplane, the second connection side opposing the first connection side of the midplane, the first blade in electrical communication with the first connector via the midplane, and the second blade coupled to the second connection side of the midplane, the second blade in electrical communication with the second connector via the midplane.

8. The apparatus of claim 7 wherein, in the first configuration:
the first module is configured as a first input/output (I/O) module having a first set of ports, the first I/O module disposed within the first expansion slot, coupled to the first connector; and in electrical communication with the first blade via the midplane;
the second module is configured as a second I/O module having a second set of ports, the second I/O module disposed within the second expansion slot, coupled to the second connector, and in electrical communication with the second blade via the midplane;

wherein the first set of ports of the first I/O module and the second set of ports of the second I/O module are operable to couple the apparatus to a network.

9. The apparatus of claim 8, wherein:

the first blade comprises a first PCI bus coupled between the first blade and an I/O resource and a second PCI bus coupled between the first blade and the first module via the mid plane; and the second blade comprises a first PCI bus coupled between the second blade and an I/O resource and a second PCI bus coupled between the second blade and the second module via the midplane.

10. The apparatus of claim 7 wherein, in the second configuration, a cache memory card is disposed within both the first expansion slot and the second expansion slot, coupled to the first connector and to the second connector, and in electrical communication with the first blade and the second blade via the midplane, the cache memory card being operable to cache writes from at least one of the first blade and the second blade.

11. The apparatus of claim 10, wherein the cache memory card comprises a two-to-one PCI switch coupled to a PCI bus disposed between the first blade and the cache memory card and coupled to a PCI bus disposed between the second blade and the cache memory card, the two-to-one PCI switch operable to gate either the PCI bus disposed between the first blade and the cache memory card or the PCI bus disposed between the second blade and the cache memory card to a cache memory of the cache memory card.

12. A storage system, comprising:

a chassis defining a first expansion slot and a second expansion slot, the chassis having a first connector disposed within the first expansion slot and a second connector disposed within the second expansion slot, the first connector coupled to a first connection side of a midplane disposed in the chassis and the second connector coupled to the first connection side of the midplane;

a first blade disposed within the chassis, the first blade coupled to a second connection side of the midplane, the second connection side opposing the first connection side of the midplane, the first blade being in electrical communication with the first connector; and a second blade disposed within the chassis, the second blade coupled to the second connection side of the midplane, the second blade being in electrical communication with the second connector;

wherein the storage system is selectively configurable as (i) a network attached storage (NAS) system when a first input/output (I/O) module having a first set of ports is inserted within the first expansion slot and electrically coupled to the first connector and when a second I/O module having a second set of ports is inserted within the second expansion slot and electrically coupled to the second connector, the first set of ports and the second set of ports operable to couple the NAS system to a network and (ii) a storage area network (SAN) when a cache memory card is inserted within both the first expansion slot and the second expansion slot and when the cache memory card is electrically coupled to the first connector and to the second connector, the first blade and the second blade being coupled to disk drives via a storage channel connection and the cache memory card being operable to cache writes from at least one of the first blade and the second blade.

13. The apparatus of claim 12, wherein:

the first blade comprises a first PCI bus coupled between the first blade and an I/O resource and a second PCI bus coupled between the first blade and the first module via the midplane; and the second blade comprises a first PCI bus coupled between the second blade and an I/O resource and a second PCI bus coupled between the second blade and the second module via the midplane.

14. The apparatus of claim 12, wherein the cache memory card comprises a two-to-one PCI switch coupled to a PCI bus disposed between the first blade and the cache memory card and coupled to a PCI bus disposed between the second blade and the cache memory card, the two-to-one PCI switch operable to gate either the PCI bus disposed between the first blade and the cache memory card or the PCI bus disposed between the second blade and the cache memory card to a cache memory of the cache memory card.

* * * * *